(12) United States Patent
Kakutani et al.

(10) Patent No.: US 12,394,255 B2
(45) Date of Patent: Aug. 19, 2025

(54) DRIVING ASSISTANCE APPARATUS, RECORDING MEDIUM HAVING DRIVING ASSISTANCE PROGRAM RECORDED THEREON, AND DRIVING ASSISTANCE METHOD

(71) Applicant: HONDA MOTOR CO., LTD., Tokyo (JP)

(72) Inventors: Kenta Kakutani, Tokyo (JP); Yoshiaki Kobayashi, Tokyo (JP); Toshiaki Matsuzawa, Tokyo (JP); Hideki Kakinuma, Tokyo (JP); Yuya Goto, Tokyo (JP); Ittoku Hirashima, Tokyo (JP); Kimiyoshi Kusaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 431 days.

(21) Appl. No.: 17/679,393

(22) Filed: Feb. 24, 2022

(65) Prior Publication Data
US 2022/0319250 A1    Oct. 6, 2022

(30) Foreign Application Priority Data

Mar. 31, 2021   (JP) ................................. 2021-062102

(51) Int. Cl.
*G07C 5/06*  (2006.01)
*B60K 35/00*  (2006.01)
*G06T 3/40*  (2006.01)
*G06T 11/00*  (2006.01)
*G06T 11/20*  (2006.01)
(Continued)

(52) U.S. Cl.
CPC ................ *G07C 5/06* (2013.01); *B60K 35/00* (2013.01); *G06T 3/40* (2013.01); *G06T 11/001* (2013.01);
(Continued)

(58) Field of Classification Search
CPC ........ B60K 35/00; B60K 35/28; B60K 35/29; B60K 35/81; B60K 2360/167;
(Continued)

(56) References Cited

U.S. PATENT DOCUMENTS

2005/0030299 A1* 2/2005 Bursill ................. H04N 21/431
345/475
2009/0165746 A1* 7/2009 Aso ....................... G01L 23/225
701/111
(Continued)

FOREIGN PATENT DOCUMENTS

CN  106232449 A  12/2016
CN  110667586 A  1/2020
(Continued)

OTHER PUBLICATIONS

Chinese Office Action dated Dec. 11, 2024 issued in corresponding Chinese application No. 202210078594.2 (9 pages).

*Primary Examiner* — Aryan E Weisenfeld
(74) *Attorney, Agent, or Firm* — Rankin, Hill & Clark LLP

(57) ABSTRACT

A driving assistance apparatus according to the present disclosure includes: a vehicle acceleration detection unit configured to detect vehicle acceleration including lateral acceleration and longitudinal acceleration of a vehicle; a calculation unit configured to calculate for each wheel a friction circle, and a lateral force generated at each wheel and a longitudinal force generated at each wheel on the basis of a result of detection by the vehicle acceleration detection unit; and a display unit configured to display an image based on the friction circle, and a magnitude and/or a direction of a resultant force of the lateral force and the longitudinal force generated at each wheel based on a result of calculation by the calculation unit.

8 Claims, 8 Drawing Sheets

(51) Int. Cl.
*G07C 5/04* (2006.01)
*B60K 35/28* (2024.01)
*B60K 35/29* (2024.01)
*B60K 35/81* (2024.01)

(52) U.S. Cl.
CPC .......... *G06T 11/203* (2013.01); *G06T 11/206* (2013.01); *G07C 5/04* (2013.01); *B60K 35/28* (2024.01); *B60K 35/29* (2024.01); *B60K 35/81* (2024.01); *B60K 2360/167* (2024.01); *B60K 2360/188* (2024.01); *G06T 2200/24* (2013.01)

(58) Field of Classification Search
CPC ... B60K 2360/188; G06T 3/40; G06T 11/001; G06T 11/203; G06T 11/206; G06T 2200/24; G07C 5/04; G07C 5/06
See application file for complete search history.

(56) References Cited

U.S. PATENT DOCUMENTS

| | | | | |
|---|---|---|---|---|
| 2010/0114449 A1* | 5/2010 | Shiozawa | ............... | B62D 6/005 701/90 |
| 2011/0082632 A1* | 4/2011 | Rowker | .................. | B60T 17/22 340/453 |
| 2016/0004423 A1* | 1/2016 | Springer | ............... | G06T 11/206 715/863 |
| 2016/0349066 A1* | 12/2016 | Chung | ................. | G01C 21/365 |
| 2017/0001646 A1* | 1/2017 | Cooke | ................... | B60W 10/18 50/14 |
| 2017/0098322 A1* | 4/2017 | Ono | ........................ | H04N 23/90 |
| 2018/0273085 A1* | 9/2018 | Sakata | ................ | B62D 5/0457 |
| 2019/0344825 A1* | 11/2019 | Umeki | .................. | B62D 6/007 |
| 2019/0367044 A1* | 12/2019 | Nakagawara | ......... | B60W 30/18 |
| 2019/0381989 A1 | 12/2019 | Nozu et al. | | |
| 2022/0266848 A1* | 8/2022 | Itou | ..................... | B60W 40/068 |

FOREIGN PATENT DOCUMENTS

| | | | |
|---|---|---|---|
| JP | H10-310042 A | 11/1998 | |
| JP | 2007007341 A * | 1/2007 | |
| JP | 2010023734 A * | 2/2010 | |
| JP | 2010069984 A * | 4/2010 | |
| JP | 2012-168958 | 9/2012 | |
| JP | 2015-101310 | 6/2015 | |
| WO | WO-2010050313 A1 * | 5/2010 | .............. B60L 11/18 |

* cited by examiner

FIG.7
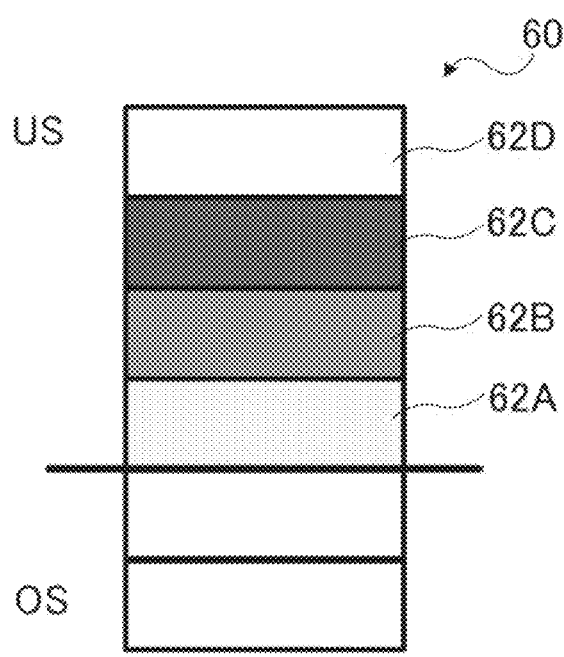
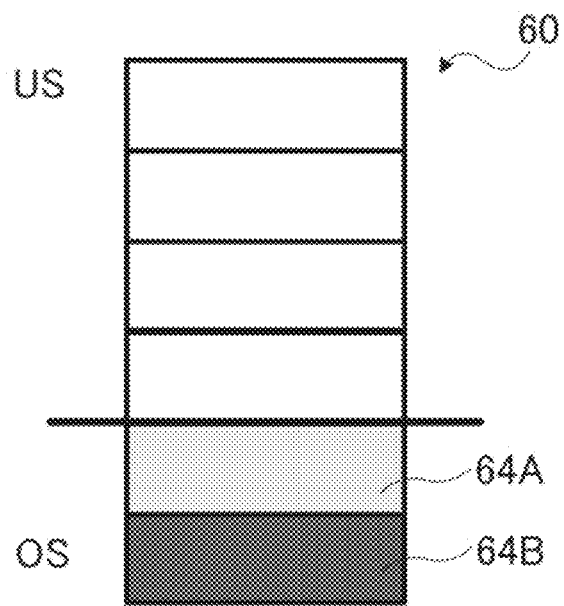

DRIVING ASSISTANCE APPARATUS, RECORDING MEDIUM HAVING DRIVING ASSISTANCE PROGRAM RECORDED THEREON, AND DRIVING ASSISTANCE METHOD

INCORPORATION BY REFERENCE

The present application claims priority under 35 U.S.C. § 119 to Japanese Patent Application No. 2021-062102 filed on Mar. 31, 2021. The content of the application is incorporated herein by reference in its entirety.

BACKGROUND OF THE INVENTION

Field of the Invention

The present disclosure relates to a driving assistance apparatus, a recording medium having a driving assistance program recorded thereon, and a driving assistance method.

Description of the Related Art

Japanese Patent Laid-Open No. 2012-168958 discloses a driving assistance apparatus that compares a friction circle and acceleration generated while a vehicle is traveling. The friction circle is set to correspond to acceleration limit values at which a tire of the vehicle starts to slip, and the friction circle can be compared to acceleration detected by an acceleration sensor. This driving assistance apparatus includes: an accelerometer that detects acceleration generated while the vehicle is traveling; a memory that stores an acceleration boundary region set before the vehicle traveling; comparison means for comparing acceleration detected by the accelerometer and the boundary region while the vehicle is traveling; and notification means for providing notification of a comparison result on the basis of comparison performed by the comparison means, while the vehicle is traveling.

Japanese Patent Laid-Open No. 2015-101310 discloses a traveling condition display apparatus that simultaneously displays the traction of each wheel of a traveling vehicle, the traction being calculated as required, and the magnitude and direction of acceleration of the traveling vehicle, the magnitude and direction changing with the traction. The traveling condition display apparatus displays traveling conditions of the vehicle by using a vehicle mimic diagram on an in-vehicle display. The traveling condition display apparatus displays the traction of at least front wheels or rear wheels, and the magnitude and direction of vehicle acceleration on or near the vehicle mimic diagram.

The related art compares the friction circle based on acceleration set values set by a driver or the like and acceleration actually measured. However, to notify the driver or the like of vehicle behavior accurately, the related art has room for improvement because acceleration limit values at which a tire starts to slip varies significantly with the tire load. Additionally, merely displaying the magnitude and direction of acceleration of the traveling vehicle does not allow the driver or the like to understand how appropriately the tire is being used.

An object of the present invention is to prove a driving assistance apparatus that notifies a driver or the like of vehicle behavior in a readily understandable manner.

SUMMARY OF THE INVENTION

In an aspect of the present invention, a driving assistance apparatus includes: a vehicle information acquisition unit configured to acquire information on a condition of a vehicle; a calculation unit configured to calculate a friction circle for each of wheels on the basis of a result of acquisition by the vehicle information acquisition unit; and a display unit configured to display an image based on the friction circle of each of the wheels.

In another aspect of the present invention, there is provided a driving assistance program for causing a computer to function as: vehicle acceleration detection means for detecting vehicle acceleration including lateral acceleration and longitudinal acceleration of a vehicle; calculation means for calculating a friction circle, a tire force, and a tire friction direction for each of wheels on a basis of a result of detection by the vehicle acceleration detection means, the tire force being a magnitude of a resultant force of a lateral force generated at a tire associated with a wheel among the wheels and a longitudinal force generated at the tire associated with the wheel among the wheels, the tire friction direction being a direction of the resultant force; and display means for displaying an image for each of the wheels on a basis of a result of calculation by the calculation means, the image being based on the friction circle, and the tire force and the tire friction direction, so that behavior of the vehicle is understood.

In another aspect of the present invention, a driving assistance method includes: a vehicle acceleration detection step of detecting vehicle acceleration including lateral acceleration and longitudinal acceleration of a vehicle, a calculation step of calculating a friction circle, a tire force, and a tire friction direction for each of wheels on a basis of a result of detection at the vehicle acceleration detection step, the tire force being a magnitude of a resultant force of a longitudinal force generated at a tire associated with a wheel among the wheels and a lateral force generated at the tire associated with the wheel among the wheels, the tire friction direction being a direction of the resultant force; and a display step of displaying an image for each of the wheels on a basis of a result of calculation at the calculation step, the image being based on the friction circle, and the tire force and the tire friction direction.

Advantageous Effect of Invention

A driving assistance apparatus according to an aspect of the present invention produces the effect of informing a driver or the like of vehicle behavior in a readily understandable manner.

BRIEF DESCRIPTION OF THE DRAWINGS

FIG. 7 is a display image showing a steering characteristic; and

DETAILED DESCRIPTION OF THE PREFERRED EMBODIMENTS (Knowledge and the Like on which the Present Disclosure is Based)

Driving assistance apparatuses having the function of displaying vehicle motion and the like to allow a driver to check vehicle behavior had been made available at the time when the present inventors arrived at the idea of the present disclosure. Such apparatuses enable the driver to check vehicle behavior in real time or later.

However, there had been no means available for the driver to determine objectively whether the capabilities of the tires are being fully exploited, and consequently, the driver just had to rely on the driver's individual sense to improve their skills to drive a vehicle.

As a solution, the present disclosure provides a driving assistance apparatus, a driving assistance program, and a driving assistance method that enable loads exerted to the tires, steering characteristics, and the like to be checked in real time or later after driving.

Some embodiments are described in detail below with reference to the drawings. Some explanation deemed more detailed than necessary may be omitted. For example, detailed description of what is well known, or duplicate description of substantially the same configuration may be omitted. This is to avoid unnecessary redundant description and to facilitate understanding of a person skilled in the art.

The accompanying drawings and the description below are provided to allow a person skilled in the art to fully understand the present disclosure but not intended to limit the subject described in the scope of the claims.

First Embodiment

A first embodiment is described below with reference to FIGS. 1 to 3.

[1-1. Configuration]

Figure 1:
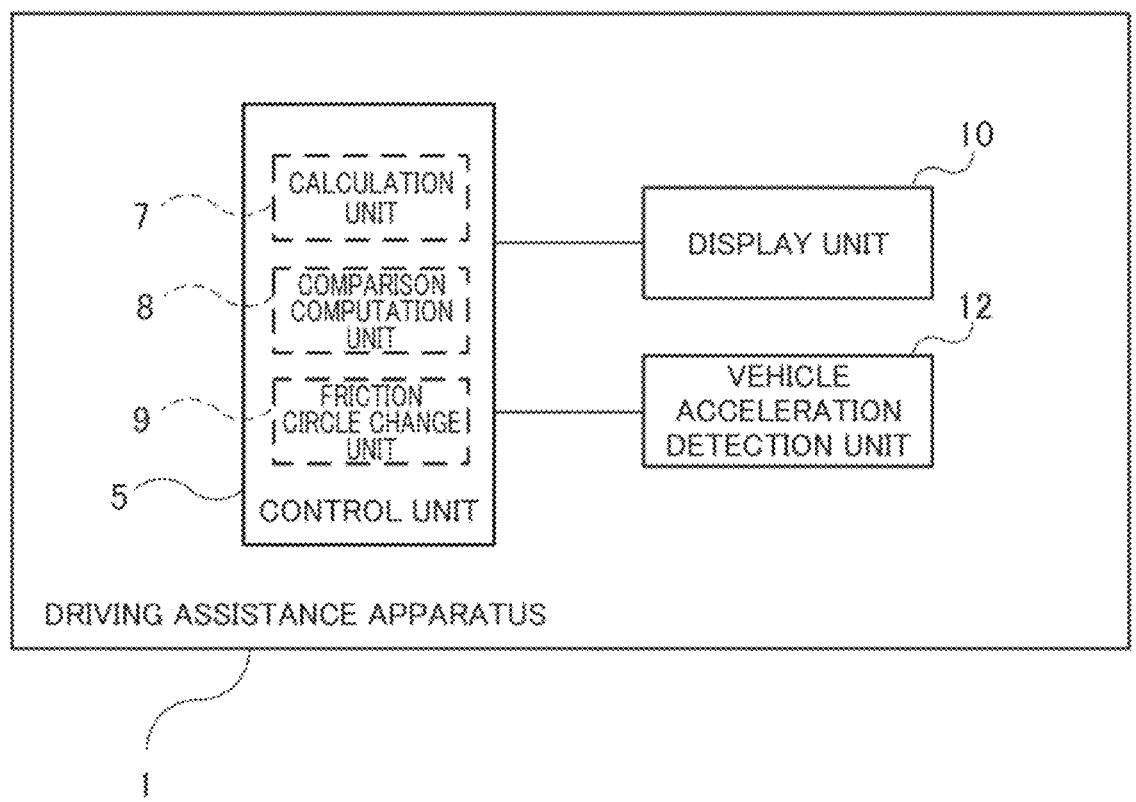
FIG. 1 is a block diagram of a driving assistance apparatus according to a first embodiment.

FIG. 1 is a block diagram of a driving assistance apparatus 1 according to the first embodiment. The driving assistance apparatus 1 includes a vehicle acceleration detection unit 12 (acceleration sensor) as a vehicle information acquisition unit, and the vehicle acceleration detection unit 12 detects vehicle acceleration including lateral acceleration and longitudinal acceleration of a vehicle. The driving assistance apparatus 1 also includes: a calculation unit 7 configured to calculate a friction circle, and a lateral force generated at a tire and a longitudinal force generated at the tire, for each wheel on the basis of a result of detection by the vehicle acceleration detection unit 12 (accelerometer); and a display unit 10 (display) configured to display an image based on the friction circle, and a magnitude and/or a direction of a resultant force of the lateral force and the longitudinal force generated at each tire on the basis of a result of calculation by the calculation unit 7.

Here, the friction circle corresponds to limit values of a tire force, and the limit values are calculated based on the coefficient of friction of a road surface and a force generated at the tire. Specifically, a magnitude of a friction force between a road surface and a tire may be expressed as a radius of the friction circle. A friction circle is depicted as having a substantially disk shape herein, and the size of the friction circle presented on the display unit 10, specifically, the radius of the friction circle, can be compared to the length of a depiction representing the resultant force generated at the tire.

Note that the friction circle may be a perfect circle or an ellipse, or a combination of ellipses having axes different in length.

While the vehicle acceleration detection unit is described herein as an example of the vehicle information acquisition unit, this is not a limitation. For example, a sensor for measuring engine torque, brake fluid pressure, or the like may be used to estimate a force generated at a tire. Alternatively, a sensor for directly measuring a force generated at a tire may be provided.

The calculation unit 7 may be achieved as a function of a control unit 5. Specifically, the control unit 5 includes a CPU, a RAM, and a ROM and executes various types of control with a processor. The CPU refers to the so-called central processing unit and executes various programs to achieve various functions. The RAM is used as a work area and memory area for the CPU, and the ROM is a recording medium having recorded thereon an operating system and programs to be executed by the CPU. Of course, an MPU (Micro-Processing Unit) may be used in place of the CPU, and wired logic, in which programs cannot be rewritten, may be used as the control unit 5. Use of wired logic as the control unit 5 is effective in achieving increased processing speed. Examples of the wired logic include ASIC (Application Specific Integrated Circuit). The control unit 5 may be made using one semiconductor device or a plurality of semiconductor devices. When a plurality of semiconductor devices is used, different elements of control described in the scope of the claims may be achieved by different semiconductor devices. The control unit 5 may include a semiconductor device and a passive component, such as a resistor or a capacitor.

The calculation unit 7 calculates for each tire: a force generated at a tire, specifically, a tire force that is a magnitude of a resultant force of a lateral force and a longitudinal force generated at a tire; and a tire friction direction that is a direction of the resultant force. The display unit 10 (display) displays an image symbolizing the tire force and the tire friction direction calculated by calculation unit 7. The display unit 10 may be a liquid crystal panel, or it may be an organic electro-luminescence panel. The display unit 10 may be placed in an in-vehicle instrument cluster or DA (display audio) device, or may be a screen of an information terminal, including a smartphone or a PC (personal computer), of a driver or an occupant to be on board the vehicle. In the case of the information terminal, the control unit 5 may transmit/receive information to/from the information terminal wirelessly.

[1-2. Calculation Method]

A calculation method for the friction circle, the tire force, and the tire friction direction is described briefly below. Note that the calculation method described herein is provided as an example and is not intended to limit the scope of the claims, and various other calculation methods are conceivable.

First, a coordinate system is given with a Z axis in a vertical direction, an X axis in a longitudinal direction of a vehicle, and a Y axis in an axle direction perpendicular to the X axis and the Z axis. Calculation of a friction circle for a tire requires the coefficient of friction $\mu$ of a road surface and a force $F_Z$ generated at the tire. When the vehicle is at a standstill, the force $F_Z$ generated at each tire is determined only by the gravity acting on the vehicle and load balance of the vehicle. That is, the size of a disk shape displayed as a friction circle is determined by multiplying the coefficient of friction $\mu$ and $F_Z$.

The coefficient of friction μ changes significantly with the condition of the road surface, specifically when it is raining or snowing or when the road surface is frozen, as well as with the amount of wear of the tire.

While the vehicle is traveling, especially when the vehicle is turning, accelerating, or decelerating, a force in the X axis direction (a longitudinal force $F_X$) and a force in the Y axis direction (a lateral force $F_Y$) are generated in the vehicle. How appropriately a tire is being used can be defined by a relationship between the tire force, the tire friction direction, and the friction circle. Specifically, the magnitude of the tire force, which is calculated based on the longitudinal force $F_X$ and the lateral force $F_Y$, in relation to the friction circle provides a guideline as to how close the tire is to the tire limit values; in other words, it leads to knowledge of how well the tire is exploited, which indicates how good or bad the driving skills are.

In an example case, the coefficient of friction μ is assumed to be the same in the X axis direction and the Y axis direction of a tire. The degree to which the capability of the tire is exploited can be given by Equation (1) and expressed as a percent.

[Equation 1]

$$\frac{\sqrt{F_x^2 + F_y^2}}{\mu \cdot F_z} \times 100(\%) \tag{1}$$

The force $F_Z$ generated at each tire is estimated from characteristics of the vehicle and acceleration. For example, the force $F_Z$ generated at each tire is calculated by calculating static balance, as in, for example, Equation (2), where L represents a wheelbase length (with the center of gravity being at an equal distance from the front and rear wheels for brevity), d represents a tread width, h represents a height of the center of gravity, M represents mass, g represents gravitational acceleration, $a_X$ represents acceleration in the X axis direction, $a_Y$ represents acceleration in the Y axis direction, the acceleration in the X axis direction and the acceleration in the Y axis direction being measured by the vehicle acceleration detection unit 12 (see FIG. 1), and R represents longitudinal balance of lateral load transfer.

[Equation 2]

$$F_z = Mg + \frac{M}{2} \cdot \frac{h}{L} \cdot a_x + MR \cdot \frac{h}{d} \cdot a_y \tag{2}$$

Unsprung inertial force is not considered here.

The longitudinal force $F_X$ generated at each tire may be estimated from a tire model or tire characteristics such as slip ratio, but it can be cumbersome. The longitudinal force $F_X$ may thus be approximately estimated from, for example, acceleration in the X axis direction. Specifically, with the effect of drag of aerodynamic force acting on the vehicle in the X axis direction taken into consideration, a basic longitudinal force $F_{X\_Total}$ generated at a tire is calculated as in Equation (3), where ρ represents air density, V represents vehicle velocity, A represents frontal projected area, and $C_d$ represents a drag coefficient.

[Equation 3]

$$F_{X\_Total} = Ma_X + \frac{1}{2}\rho V^2 \cdot C_d \cdot A \tag{3}$$

In the case where an LSD (limited slip differential) is provided that makes rotation differentials appropriate between the inner and outer tires while the vehicle is accelerating and turning, a longitudinal force $F_{X\_Acc}$ to a tire during acceleration is estimated as in Equation (4), where X represents an LSD traction distribution G coefficient, and $a_Y$ represents acceleration in the Y axis direction.

[Equation 4]

$$F_{X\_Acc} = F_{X\_Total} \cdot (\frac{1}{2} + X \cdot a_Y) \tag{4}$$

A longitudinal force $F_{X\_Brake}$ generated at a tire during braking is estimated, with the assumption that the same longitudinal force is distributed to the left and right tires, as in Equation (5), where B represents a coefficient representing braking balance.

[Equation 5]

$$F_{X\_Brake} = \frac{F_{X\_Total} \cdot B}{2} \tag{5}$$

As the longitudinal force $F_X$ generated at each tire, $F_{X\_Acc}$ may be used during acceleration, and $F_{X\_Brake}$ may be used during braking.

The lateral force $F_Y$ generated at each tire can also be estimated in a simplified manner from lateral acceleration $a_Y$ and a yaw rate r. A lateral force $F_{Y\_Front}$ for a front tire is estimated as in Equation (6), where $M_f$ represents an axle load on the vehicle front side, I represents a moment of inertia of the vehicle, and L represents the wheelbase length.

[Equation 6]

$$F_{Y\_Front} = M_f \cdot a_Y + \frac{I \cdot r}{L} \tag{6}$$

Here, the distribution of $F_Y$ between the front and rear is calculated as a two-wheel model.

With the distribution between the right and left being proportional to $F_Z$ values, and the reduction rate of the reduction in the coefficient of friction in the inner tire caused by an increase in load in the outer wheel is defined as a reduction rate ε, a lateral force $F_{Y\_FL}$ generated at the front left tire, for example, is estimated as in Equation (7), where $F_{Z\_FL}$ represents a force generated at the front left tire, and $F_{Z\_FR}$ represents a force generated at the front right tire.

[Equation 7]

$$F_{Y\_FL} = F_{Y\_Front} \cdot \left( \frac{F_{Z_{FL}}}{F_{Z_{FL}} + F_{Z_{FR}}} - \epsilon \cdot F_{Z_{FL}} \right) \tag{7}$$

Using an estimation method as described above, the degree to which the capabilities of the tires are exploited can be estimated.

[1-3. Operation]

Figure 2:
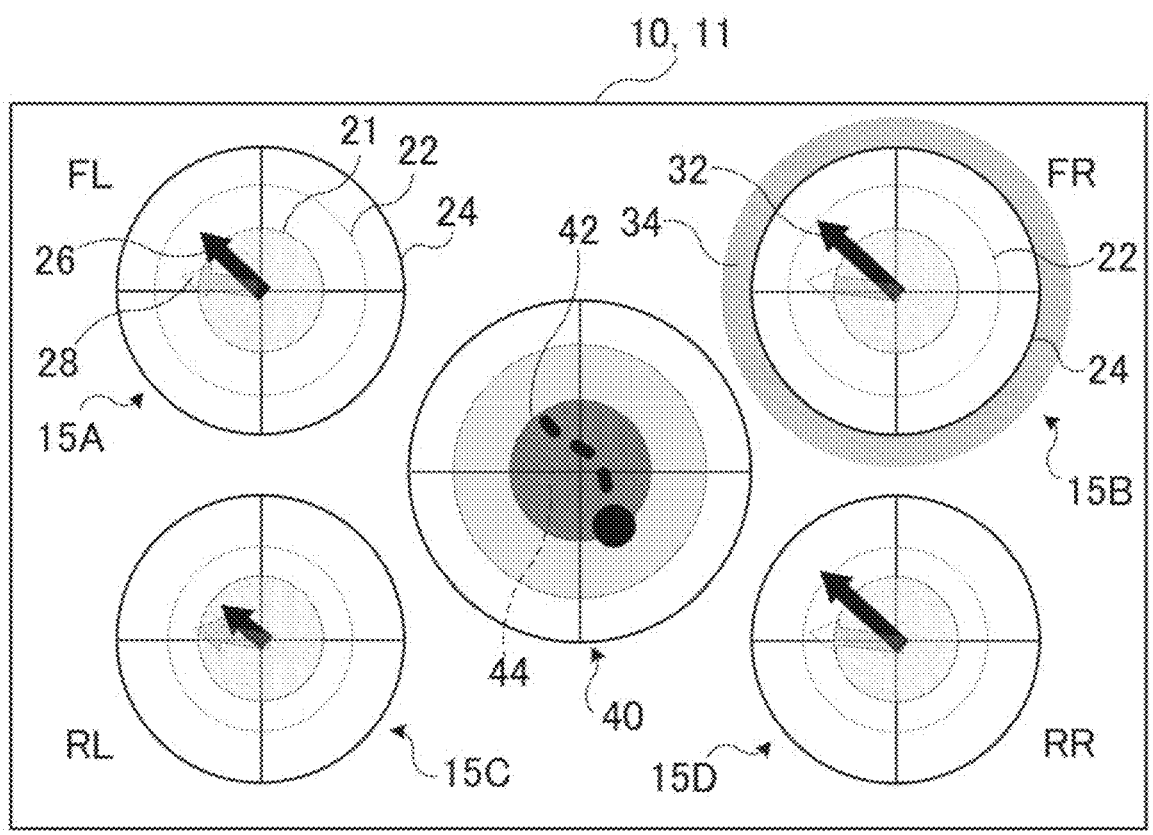
FIG. 2 shows a display image in the driving assistance apparatus.

FIG. 2 shows an example of a display image 11 presented on the display unit 10 of the driving assistance apparatus 1. The display image 11 includes: a tire friction depiction image 15A showing information on a FL (front left wheel) tire; a tire friction depiction image 15B showing information on a FR (front right wheel) tire; a tire friction depiction image 15C showing information on a RL (rear left wheel)

tire; and a tire friction depiction image 15D showing information on a RR (rear right wheel) tire.

The tire friction depiction images 15 each display a 1 G depiction circle 21 that is a friction circle corresponding to a force generated at an associated tire while the vehicle is stopped, and a maximum friction circle 24 that is a friction circle produced when an extremely large grip capacity is assumed for the associated tire. The size of the maximum friction circle 24 may correspond to, for example, 9 kN for the front wheels and 6 kN for the rear wheels.

Since the coefficient of friction $\mu$ changes significantly with the condition of a road surface, specifically when it is raining or snowing or when the road surface is frozen, as well as with the amount of wear of the tire, the coefficient of friction $\mu$ used for the calculation of the size of a friction circle 22 may be changed accordingly. Furthermore, the control unit 5 may include a friction circle change unit 9 configured to change the size of a friction circle 22. Specifically, a setting screen for changing the size of a friction circle 22 is preferably displayed on the display unit 10 so that the user can change the size of the friction circle 22.

The driving assistance apparatus may, of course, acquire the condition of a road surface and the amount of wear of a tire, and the friction circle change unit 9 may change the size of the friction circle 22. Specifically, the coefficient of friction $\mu$ may be estimated from measurements of the temperature or wetness of the road surface or from the travel distance from the tire change, and the size of the friction circle 22 may be calculated and changed based on the estimated value.

Furthermore, the calculation unit 7 calculates the tire force and the tire friction direction at a first timing and at a second timing that is a time later than the first timing, and the display unit 10 displays substantially simultaneously a first image showing a first tire force and a first tire friction direction calculated at the first timing, and a second image showing a second tire force and a second tire friction direction calculated at the second timing. The number of timings and the number of images showing the tire force and the tire friction direction calculated at each timing may be set arbitrarily.

Specifically, for example, in the tire friction depiction image 15A showing information on the tire of the front left wheel, a resultant force from measurements taken at the latest timing corresponding to the second timing, that is, a resultant force of the second tire force and the second tire friction direction, is indicated by an arrow that is a second-timing resultant force depiction 26, and a resultant force from measurements at the first timing corresponding to a timing 100 milliseconds before the second timing is indicated by a first-timing resultant force depiction 28. The length of each of the arrows corresponds to the magnitude of the associated resultant force, specifically the tire force, and the direction of each of the arrows corresponds to the direction of the associated resultant force, specifically the tire friction direction. With a sampling interval of, for example, 100 milliseconds, the tire friction depiction images 15 may be updated every 100 milliseconds. When images from multiple timings are displayed, the luminance may be lower for earlier data. Alternatively, different colors may be used for different timings. Also, data from an earlier time may be erased from the display image 11 after the elapse of a predefined time.

The driving assistance apparatus 1 also includes a comparison computation unit 8 configured to compare a tire force and a size of a friction circle. If a predefined first state, in which the tire force is in a range not exceeding the size of the friction circle 22, is determined based on a result of the comparison by the comparison computation unit 8, the display unit 10 notifies the user of the first state. The first state is a state in which the value calculated from Equation (1) is in a range, for example, from 80% to 100%.

Specifically, if, in the tire friction depiction image 15B, a second-timing resultant force depiction 32 has a length equal to or greater than 80% and equal to or less than 100% of the radius of the friction circle 22, it is determined that the tire is used appropriately and a suitable use depiction 34 is displayed. In other words, the driver is notified that the driver has exploited the capability of the tire when Equation (1) gives a value equal to or greater than 80% and equal to or less than 100%. As the suitable use depiction 34, the outer periphery of the maximum friction circle 24 may be, for example, illuminated green.

The display image 11 also includes a center-of-gravity depiction 40 showing the location of a center of gravity of the vehicle or the magnitude and direction of acceleration at the location of vehicle center of gravity. The center-of-gravity depiction 40 may present a center of gravity 42 showing the location of a center of gravity, and a center-of-gravity path 44 showing change in path of the center of gravity with time.

The control unit 5 of the driving assistance apparatus 1 may include a recording unit (not shown) configured to record information on the friction circles 22, the resultant force depictions, and the suitable use depictions 34 continuously and chronologically. Specifically, the recording unit may be an SSD (solid state drive) or an HDD (hard disk drive). The driver can acquire the information from the recording unit and display the information on the display unit 10 after driving, so that the driver can review the driving of the driver objectively. The information, of course, may be moved to an information device, including a smartphone or a PC (personal computer), so that the driver can analyze the information on the information device.

Figure 3:
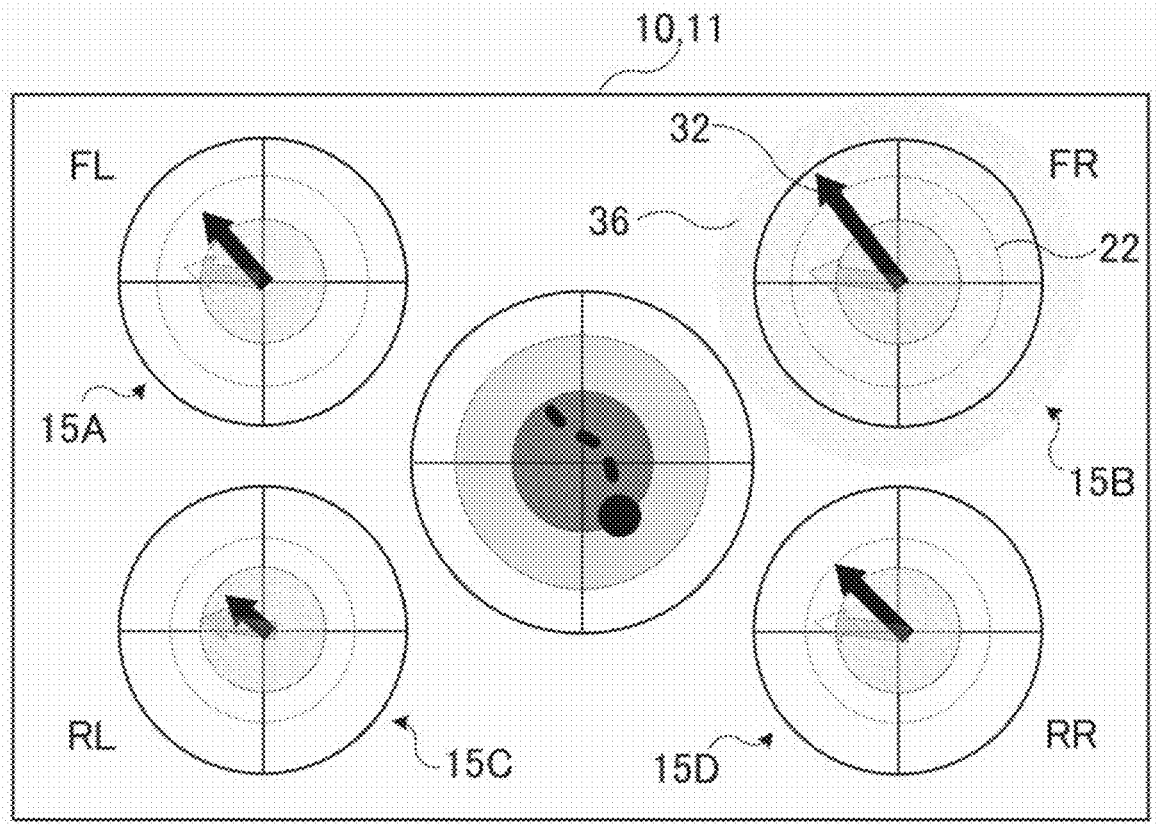
FIG. 3 shows a warning depiction in the display image.

FIG. 3 shows a warning depiction 36 in the display image 11. If a second state, in which a tire force exceeds the size of a friction circle 22, is determined based on a result of comparison by the comparison computation unit 8, the display unit 10 notifies the user of the second state. The second state is a state in which the use condition of a tire has exceeded the tire limit values.

Specifically, the control unit 5 performs control to present the warning depiction 36 on the display unit 10 if the length of the second-timing resultant force depiction 32 has exceeded the size of the friction circle 22, which means that the tire force, which is the magnitude of the resultant force generated at the tire, has exceeded the tire limit values and the risk of slipping has increased. The warning depiction 36 may be superimposed on the tire friction depiction image 15 for the corresponding tire. For example, the warning depiction 36 may be a red disk image superimposed on the tire friction depiction image 15. A warning sound may also be provided at the time of presenting the warning depiction 36.

The control unit 5 may have a display setting change mode that enables a user to increase or decrease the size of a friction circle 22 and the size of an image depicting the tire force and the tire friction direction on the display unit 10. Specifically, when a user feels that the display size of the friction circle 22 is small, the user can preferably enlarge the friction circle together with the image depicting the resultant force generated at the tire. To enlarge the images, the display unit 10 may be a touch panel and swipe actions may be used to enlarge the images, and enlargement magnifications may be available for selection.

[1-4. Effects and the Like]

The driving assistance apparatus 1 according to the present disclosure includes: the vehicle information acquisition unit configured to acquire information on a condition of a vehicle; the calculation unit 7 configured to calculate a friction circle for each of wheels on the basis of a result of acquisition by the vehicle information acquisition unit; and the display unit 10 configured to display an image based on the friction circle for each of the wheels.

The driving assistance apparatus 1 thus produces excellent effects of enabling a driver or an occupant to recognize limitations of each tire force or the like visually and thereby enabling the driver to drive the vehicle with increased accuracy.

The driving assistance apparatus 1 according to the present disclosure includes the friction circle change unit 9 configured to change the size of a friction circle.

Thus, a friction circle can be calculated and displayed reflecting the coefficient of friction $\mu$, which changes significantly with the condition of a road surface, specifically when it is raining or snowing or when the road surface is frozen, as well as with the amount of wear of the tire. Therefore, the user can easily obtain visual information that better reflects the conditions.

The vehicle information acquisition unit in the driving assistance apparatus 1 according to the present disclosure is the vehicle acceleration detection unit configured to detect vehicle acceleration including lateral acceleration and longitudinal acceleration.

It is thus unnecessary to add a special sensor because vehicles are often provided with an acceleration sensor that is available. Acceleration sensors are inexpensive and accurate, and so friction circles can be obtained accurately. The use of the vehicle acceleration detection unit also produces excellent effects of enabling the driver or the occupant to recognize the tire friction direction, which is described below, easily and quantitatively, thus enabling the driver to drive the vehicle with increased accuracy.

In the driving assistance apparatus 1 according to the present disclosure, the calculation unit 7 calculates a tire force and a tire friction direction for each of the wheels on the basis of vehicle acceleration. The tire force is the magnitude of a resultant force of a lateral force generated at a tire associated with a wheel among the wheels and a longitudinal force generated at the tire associated with the wheel among the wheels, and the tire friction direction is the direction of the resultant force. The display unit 10 displays the tire force and the tire friction direction calculated by the calculation unit 7 as an image.

The driving assistance apparatus 1 thus produces excellent effects of enabling the driver or the occupant to recognize use conditions of each tire visually and thereby enabling the driver to drive the vehicle with increased accuracy.

In the driving assistance apparatus 1 according to the present disclosure, the calculation unit 7 calculates the tire force and the tire friction direction at a first timing and at a second timing that is a time later than the first timing, and the display unit 10 displays a first image and a second image substantially simultaneously. The first image shows a first tire force and a first tire friction direction calculated at the first timing, and the second image shows a second tire force and a second tire friction direction calculated at the second timing.

Thus, the driver or the occupant can grasp use conditions of the tires continuously and chronologically. Therefore, in the case of the driver or the occupant reviewing the information from a run on a racing circuit, for example, the driver or the occupant can gain knowledge including how the vehicle should be driven to exploit the capabilities of the vehicle to its limits, which leads to improved driving skills.

In the driving assistance apparatus 1 according to the present disclosure, the display unit 10, if displaying the second image, displays the second image in a color different from that of the first image.

This makes the latest conditions of the tires easier to recognize visually for the driver or the occupant. The driver is thus enabled to drive the vehicle more appropriately.

In the driving assistance apparatus 1 according to the present disclosure, the display unit 10, if displaying the second image, stops displaying the first image after a predefined time elapses from when the display unit 10 has displayed the first image.

This makes the latest conditions of the tires easier to recognize visually for the driver or the occupant. The driver is thus enabled to drive the vehicle more appropriately.

The driving assistance apparatus 1 according to the present disclosure includes the comparison computation unit 8 configured to compare a tire force and the size of a friction circle 22.

Thus, the use conditions of the tires and the limits of capabilities of the tires can be compared. The driver can therefore understand the degree to which the driver is exploiting the capabilities of the vehicle with the driver's driving skills.

In the driving assistance apparatus 1 according to the present disclosure, if the predefined first state, in which a tire force is in a range not exceeding the size of a friction circle 22, is determined based on a result of comparison by the comparison computation unit 8, the display unit 10 notifies the user of the first state.

The driver can thus recognize that the predefined state is present. Specifically, the driver can check if the driver is exploiting the capabilities of the tires to the tire limits with the driver's driving skills, so that the driver can improve the driving skills.

In the driving assistance apparatus 1 according to the present disclosure, if the second state, in which a tire force exceeds the size of a friction circle 22, is determined based on a result of comparison by the comparison computation unit 8, the display unit 10 notifies the user of the second state.

The driver or the occupant can thus recognize a condition in which the limits of the capability of the tire are exceeded. The driver can therefore avoid dangerous driving and gain tips leading to improved driving skills.

The driving assistance apparatus 1 according to the present disclosure has the display setting change mode, which enables the user to increase or decrease a size of a friction circle 22 and an image depicting a tire force and a tire friction direction on the display unit 10.

The driver can thus visually check the magnitude of the tire forces easily when the tires have lowered limit values. The driver can therefore avoid dangerous driving and gain tips leading to improved driving skills.

Second Embodiment

A second embodiment is described below with reference to FIG. 4.

[2-1. Configuration]

Figure 4:
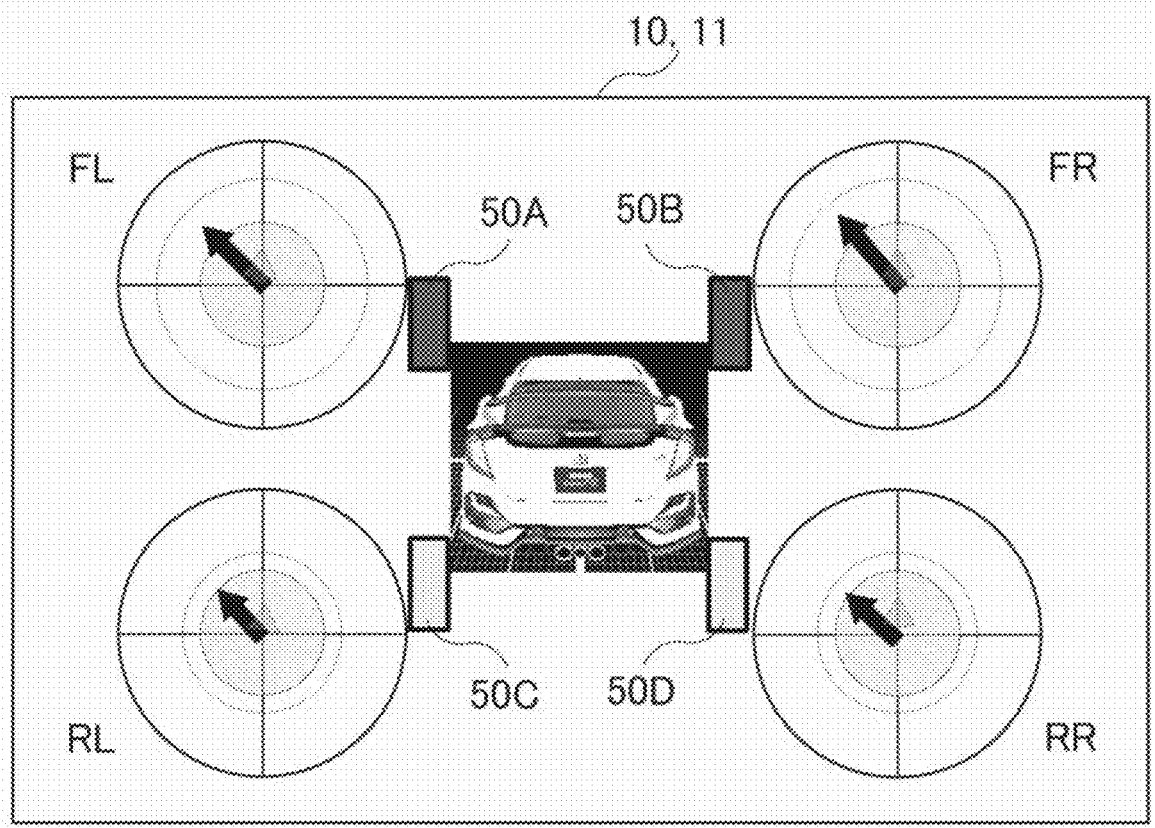
FIG. 4 shows a display image according to a second embodiment.

FIG. 4 shows a display image 11 according to the second embodiment. In the present embodiment, the display image 11 includes load depictions 50 in place of the center-ofgravity depiction 40, each of the load depictions 50 showing a force generated at an associated tire. Specifically, a calculation unit 7 calculates a magnitude of a load exerted on each tire, and a display unit 10 displays the magnitude of the load for each tire. The other elements of the configuration and the calculation method to calculate values to generate the depictions to be displayed are similar to those of the first embodiment, and so their description is omitted.

[2-2. Operation]

Operation is described next. FIG. 4 shows load transfer occurring when a vehicle is braking and turning right in the drawing. In this case, load is transferred to the front tires due to the braking operation.

A depiction of the vehicle may be disposed at the center of the display image 11, with friction circles disposed adjacent to respective tires.

When the load applied to the tire is larger than the average load applied to each tire when the vehicle is in a stationary state, the luminance may be increased. Alternatively, color coding may be used in which, for example, when the load applied to the tire is smaller than the average load applied to each tire when the vehicle is stationary, the load applied to the tire is shown in blue and when the load applied to the tire is larger than the average load applied to each tire when the vehicle is stationary, the load applied to the tire is shown in red, or a one-dimensional bar graph may be used to indicate the magnitude of the load. In the case of FIG. 4, a load depiction 50A depicting a load on the front left tire and a load depiction 50B depicting a load on the front right tire are highlighted.

[2-3. Effects and the Like]

In a driving assistance apparatus 1 according to the present disclosure, the calculation unit 7 calculates the magnitude of an exerted load for each of wheels, and the display unit 10 displays the magnitude of the load for each of the wheels.

Thus, loading to each of the wheels can be understood easily. It is thus easier for a driver or an occupant to recognize the driving conditions.

Third Embodiment

A third embodiment is described below with reference to FIGS. 5 to 7.

[3-1. Configuration]

Figure 5:
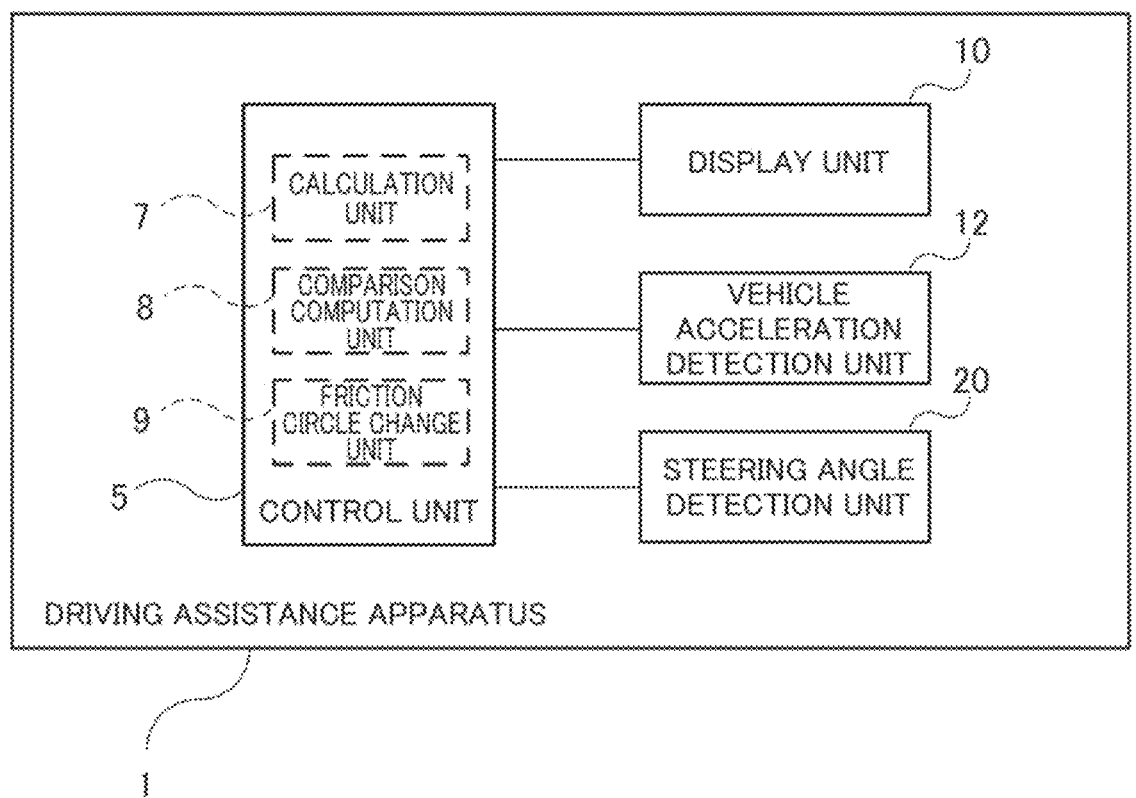
FIG. 5 is a block diagram of a driving assistance apparatus according to a third embodiment.

FIG. 5 is a block diagram of a driving assistance apparatus 1 according to the third embodiment. A control unit 5 includes a steering angle detection unit 20 (steering angle sensor) configured to detect a steering angle. Other elements are similar to those of the first embodiment, and so their description is omitted.

Figure 6:
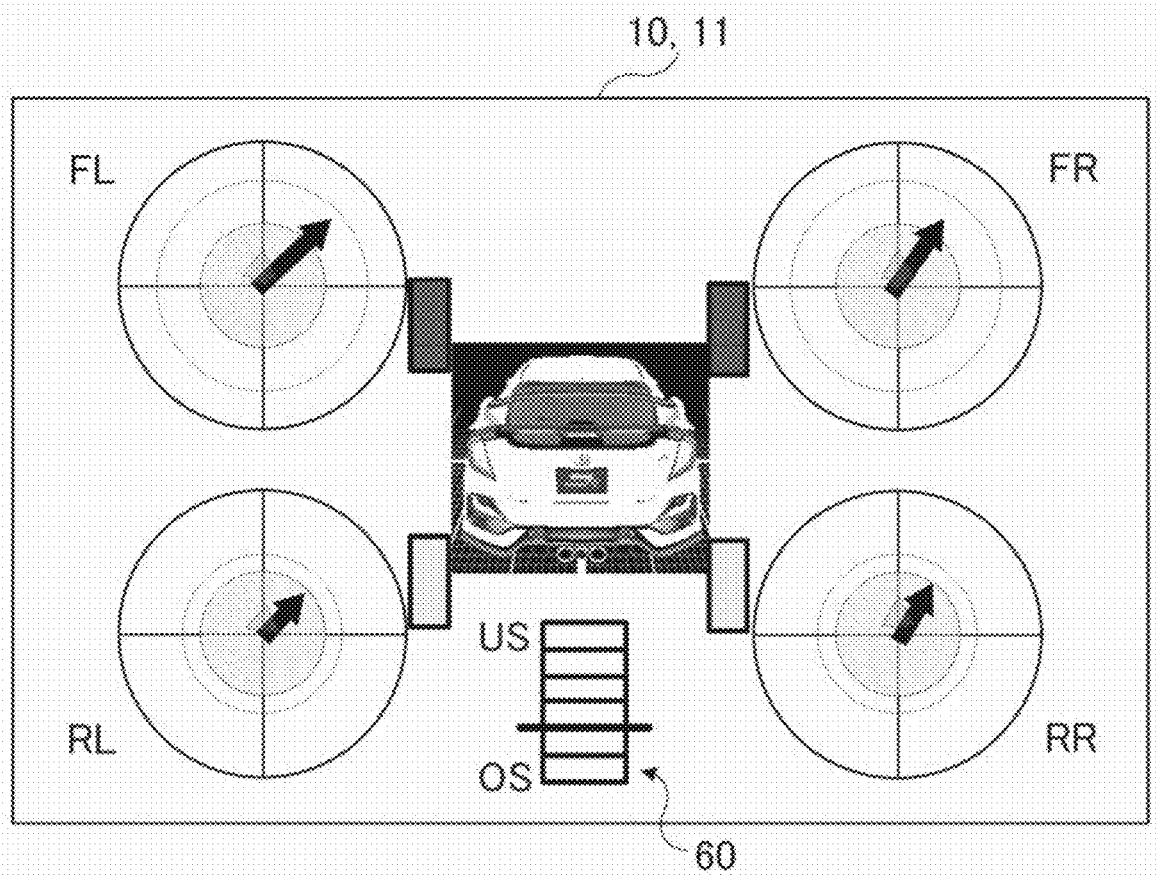
FIG. 6 is a display image according to the third embodiment.

FIG. 6 shows a display image 11 according to the third embodiment. The display image 11 includes a steering characteristic depiction 60 showing a steering characteristic in, for example, a lower middle portion of the display image 11. The steering characteristic refers to a relationship between operation of a steering wheel and behavior of a vehicle. Specifically, the steering characteristic shows a characteristic of the vehicle exhibited when the direction of the vehicle is changed. The steering characteristic can be classified into: understeer (US), in which a turning radius increases as speed increases; oversteer (OS), in which the turning radius decreases as the speed increases; and neutral steer, in which the turning radius does not change as the speed changes. Generally, the characteristic can be changed by setting of elements such as in the suspension.

[3-2. Operation]

Generally, a change in turning radius can be expressed by a stability factor, a difference in slip angle between the front and rear tires, or the like. Here, a stability factor is explained as an example. Specifically, the stability factor is determined by, for example, a relationship between cornering power K, which is a proportionality factor between a sideslip angle β for each tire and a magnitude of a lateral force F generated at an associated tire, and distance from the center of gravity to the axles of the front and rear wheels. When the stability factor takes a positive value, the vehicle has US, and when the stability factor takes a negative value, the vehicle has OS.

In the present embodiment, the display image 11 presented on the display unit 10 includes the steering characteristic depiction 60 reflecting the stability factor.

FIG. 7 shows an example of the steering characteristic depiction 60. In the present embodiment, the magnitude of the stability factor is indicated by a one-dimensional bar graph. If the stability factor is positive, that is, an understeer state exists, the steering characteristic depiction 60 notifies a driver or an occupant that the steering characteristic is in US by illuminating an understeer characteristic depiction 62A, an understeer characteristic depiction 62B, and an understeer characteristic depiction 62C, which are depictions on the US side. If the stability factor is negative, that is, an oversteer state exists, the steering characteristic depiction 60 notifies the driver or the occupant that the steering characteristic is in OS by illuminating an oversteer characteristic depiction 64A and an oversteer characteristic depiction 64B, which are depictions on the OS side.

[3-3. Effects and the Like]

The driving assistance apparatus 1 according to the present disclosure includes the steering angle detection unit 20 configured to detect a steering angle of a vehicle. In the present disclosure, the calculation unit 7 calculates a steering characteristic of the vehicle on the basis of vehicle acceleration and the steering angle, and the display unit 10 displays the steering characteristic.

A driver or an occupant can thus visually recognize the steering characteristic of the vehicle. The driver can therefore drive the vehicle appropriately according to the steering characteristic and thereby improve the driving skills.

The first to third embodiments described above may be achieved by a driving assistance program for causing a computer to function as: vehicle acceleration detection means for detecting vehicle acceleration including lateral acceleration and longitudinal acceleration of a vehicle; calculation means for calculating a friction circle, a lateral force generated at a tire, and a longitudinal force generated at the tire for each wheel on the basis of a result of detection by the vehicle acceleration detection means; and display means for displaying, on the basis of a result of calculation by the calculation means, an image based on the friction circle, and a magnitude of a resultant force and/or a direction of the resultant force, the resultant force resulting from the lateral force and the longitudinal force generated at each tire, so that a user, specifically a driver, for example, may understand the behavior of the vehicle.

Fourth Embodiment

A fourth embodiment is described below with reference to FIG. 8.

Figure 8:
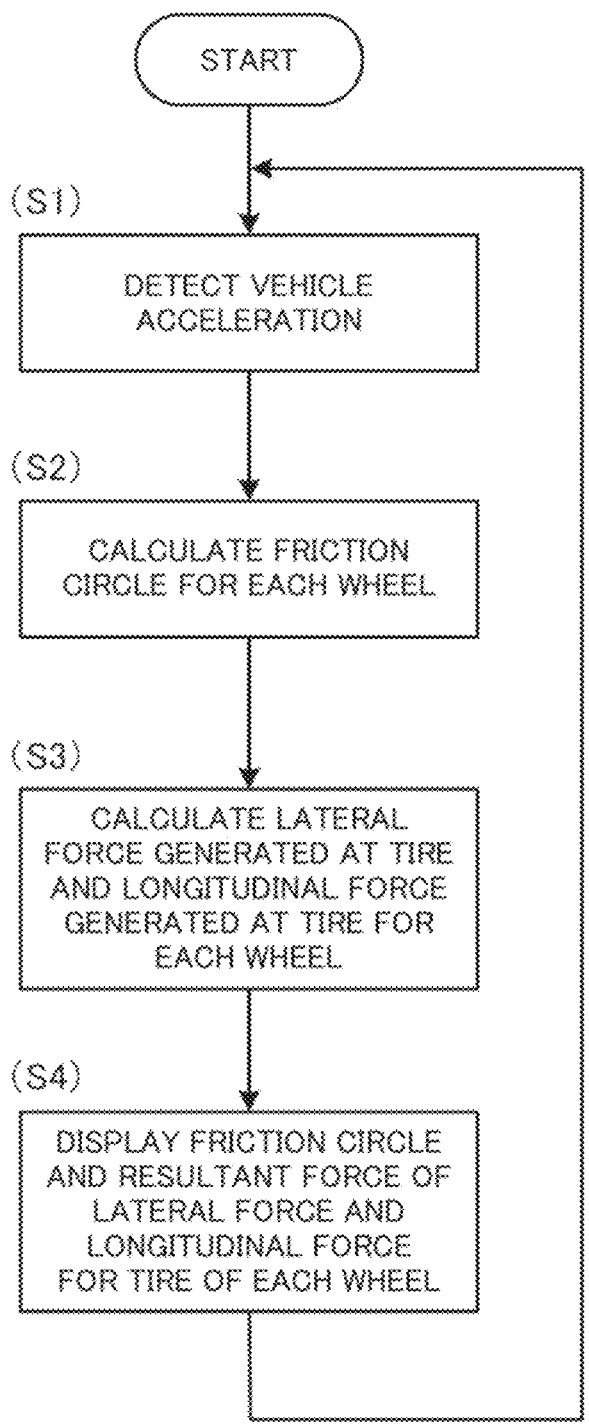
FIG. 8 shows a flowchart of a driving assistance method according to a fourth embodiment.

FIG. 8 is a flowchart of a driving assistance method according to the present disclosure. First, vehicle acceleration including lateral acceleration and longitudinal acceleration of a vehicle is detected (step S1). Then, based on a result of detection at step S1, a friction circle is calculated (step S2) for each tire. Based on the result of detection, a lateral force generated at each tire and a longitudinal force generated at each tire are calculated (step S3). Then, an image is displayed (step S4) for each tire, the image being based on the friction circle, and a tire force that is a magnitude of a resultant force of the lateral force and longitudinal force generated at each tire, and a tire friction direction that is a direction of the resultant force for each tire.

The driving assistance method according to the present disclosure produces excellent effects of enabling a driver or an occupant to recognize the use conditions of the tires visually, and thereby enabling the driver to drive the vehicle with improved accuracy.

The first to fourth embodiments have been described as examples of the technique disclosed in the present application. This, however, is not intended to limit the technique of the present disclosure, and the technique of the present disclosure is applicable to embodiments in which a change, a replacement, an addition, an omission, or the like is made. Moreover, elements described in the first to fourth embodiments may be combined to achieve a new embodiment.

REFERENCE SIGNS LIST

1 . . . driving assistance apparatus, 5 . . . control unit, 7 . . . calculation unit, 8 . . . comparison computation unit, 9 . . . friction circle change unit, 10 . . . display unit, 11 . . . display image, 12 . . . vehicle acceleration detection unit, 15 . . . tire friction depiction image, 20 . . . steering angle detection unit, 21 . . . 1 G depiction circle, 22 . . . friction circle, 24 . . . maximum friction circle, 26 . . . second-timing resultant force depiction, 28 . . . first-timing resultant force depiction, 32 . . . second-timing resultant force depiction, 34 . . . suitable use depiction, 36 . . . warning depiction, 40 . . . center-of-gravity depiction, 42 . . . center of gravity, 44 . . . center-of-gravity path, 50 . . . load depiction, 60 . . . steering characteristic depiction, 62 . . . understeer characteristic depiction, 64 . . . oversteer characteristic depiction.

What is claimed is:

1. A driving assistance apparatus comprising a processor, wherein the processor:
acquires information on a condition of a vehicle;
calculates a friction circle for each of wheels based on a result of acquisition;
displays an image based on the friction circle for each of the wheels on a display;
detects a vehicle acceleration including lateral acceleration and longitudinal acceleration;
calculates a tire force and a tire friction direction for each of the wheels on a basis of the vehicle acceleration, the tire force being a magnitude of a resultant force of a lateral force generated at a tire associated with a wheel among the wheels and a longitudinal force generated at the tire associated with the wheel among the wheels;
displays the tire force and the tire friction direction, as a first image on the display;
executes a comparison computation to compare the tire force and a size of the friction circle;
when a predefined first state is determined based on a result of the comparison by the comparison computation, displays a depiction of the first state on the display, the first state being a state in which the tire force is in a range not exceeding the size of the friction circle;
when a predefined second state is determined based on the result of the comparison by the comparison computation, displays a depiction of the second state on the display, the second state being a state in which the tire force exceeds the size of the friction circle;
obtains a location of a center of gravity of the vehicle;
displays the location of the center of gravity of the vehicle and a center-of-gravity path showing changes in path of the center of gravity of the vehicle with time, as a second image on the display; and
the first image and the second image are displayed in different areas on the display so as to correspond to each other.

2. The driving assistance apparatus according to claim 1, wherein the processor changes the size of the friction circle.

3. The driving assistance apparatus according to claim 1, wherein, when the processor displays the second image on the display, the processor displays the second image in a color different from a color of the first image.

4. The driving assistance apparatus according to claim 1, wherein, when the processor displays the second image, the processor stops displaying the first image on the display after a predefined time elapses from when the processor has displayed the first image.

5. The driving assistance apparatus according to claim 1, wherein the processor provides a display setting change mode that enables a user to increase or decrease the size of the friction circle shown on the display and the image showing the tire force and the tire friction direction.

6. The driving assistance apparatus according to claim 1, wherein the processor calculates a magnitude of a load exerted on each of the wheels, and
displays the magnitude of the load on the display for each of the wheels.

7. The driving assistance apparatus according to claim 1, wherein the processor detects a steering angle of the vehicle,
calculates a steering characteristic of the vehicle on a basis of the vehicle acceleration and the steering angle, and
displays the steering characteristic on the display.

8. A driving assistance method comprising:
a vehicle acceleration detection step of detecting a vehicle acceleration including lateral acceleration and longitudinal acceleration of a vehicle;
a step of calculating a friction circle, a tire force, and a tire friction direction for each of wheels on a basis of a result of detection at the vehicle acceleration detection step, the tire force being a magnitude of a resultant force of a lateral force generated at a tire associated with a wheel among the wheels and a longitudinal force generated at the tire associated with the wheel among the wheels, the tire friction direction being a direction of the resultant force;
a step of displaying a first image for each of the wheels on a basis of a result of the calculation at the calculation step, the image being based on the friction circle, the tire force and the tire friction direction, with the tire force and the tire friction direction displayed on a display;
a step of executing a comparison computation to compare the tire force and a size of the friction circle;
when a predefined first state is determined based on a result of the comparison by the comparison computation, a step of displaying a depiction of the first state on the display, the first state being a state in which the tire force is in a range not exceeding the size of the friction circle;

when a predefined second state is determined based on the result of the comparison by the comparison computation, a step of displaying a depiction of the second state on the display, the second state being a state in which the tire force exceeds the size of the friction circle;

a step of obtaining a location of a center of gravity of the vehicle; and a step of displaying the location of the center of gravity of the vehicle and a center-of-gravity path showing change in path of the center of gravity of the vehicle with time, as a second image on the display, wherein the first image and the second image are displayed in different areas on the display so as to correspond to each other.

\* \* \* \* \*